Oct. 11, 1932.     H. C. JORDHOY     1,881,648
METHOD OF SEPARATING THE RISER FROM A STEREOTYPE PRINTING PLATE
Original Filed May 12, 1926     3 Sheets-Sheet 1
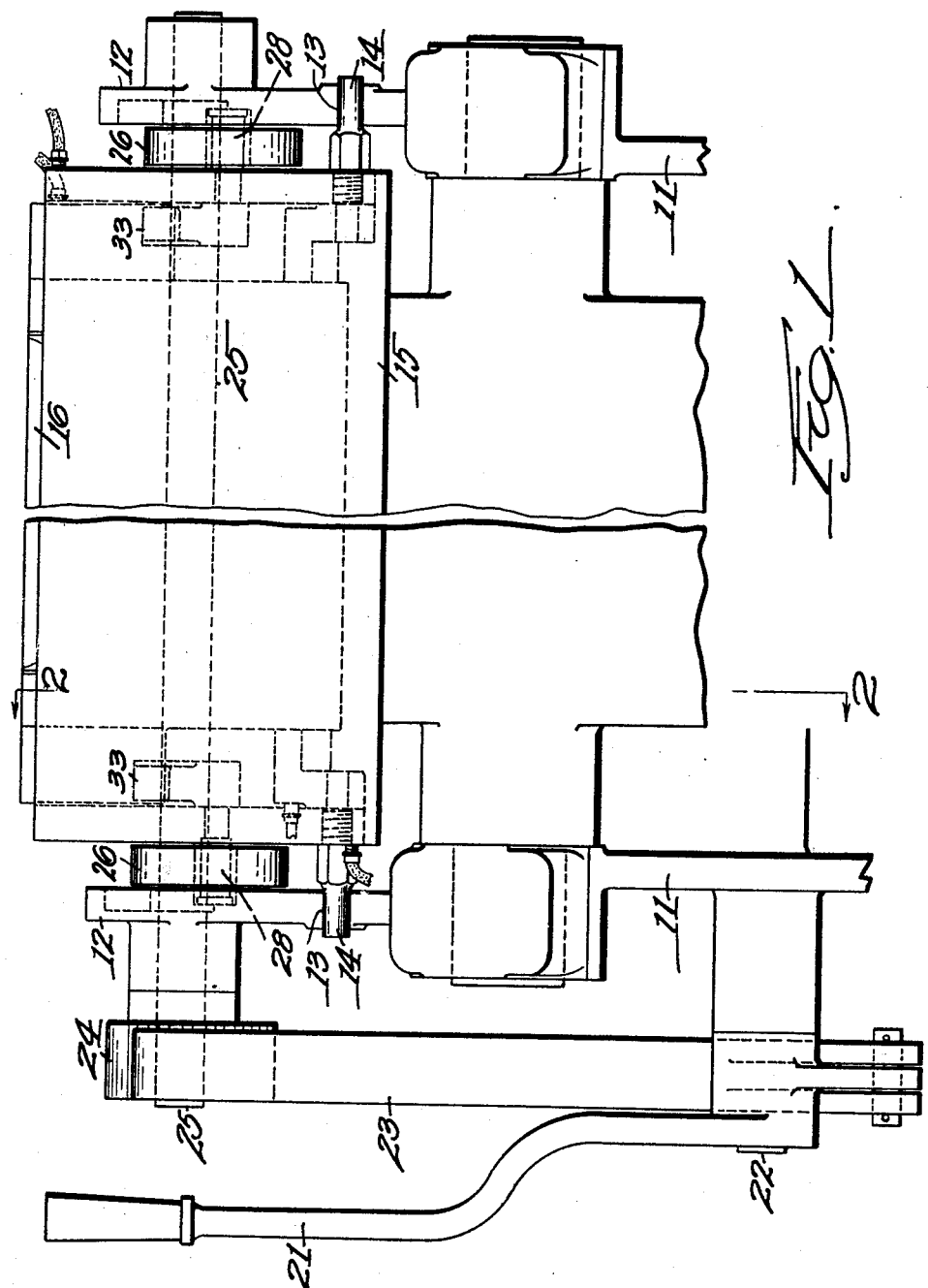

Oct. 11, 1932.　　　　H. C. JORDHOY　　　　1,881,648
METHOD OF SEPARATING THE RISER FROM A STEREOTYPE PRINTING PLATE
Original Filed May 12, 1926　　3 Sheets-Sheet 2
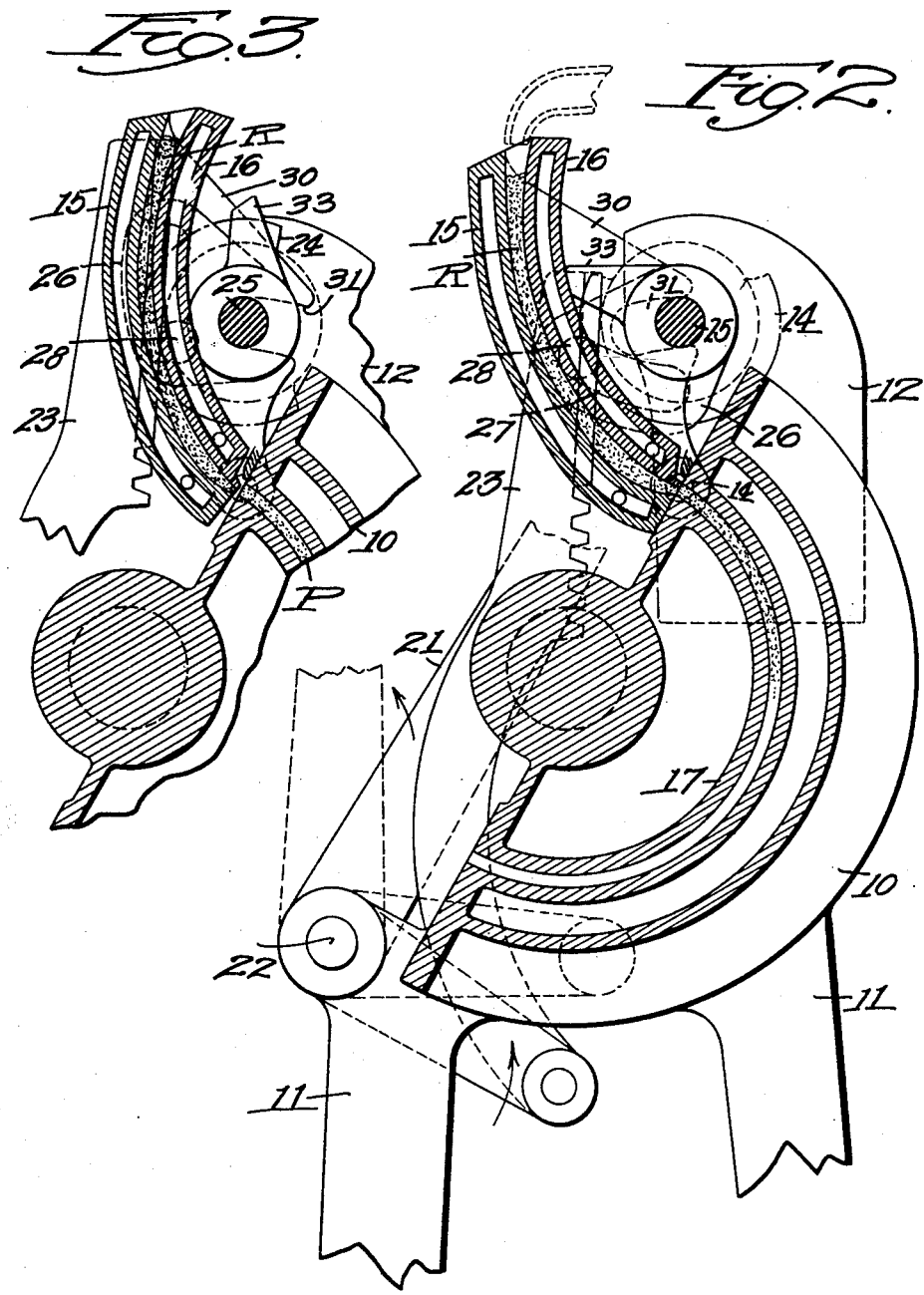
INVENTOR.
Hans C. Jordhoy
BY
ATTORNEYS.

Oct. 11, 1932. H. C. JORDHOY 1,881,648
METHOD OF SEPARATING THE RISER FROM A STEREOTYPE PRINTING PLATE
Original Filed May 12, 1926 3 Sheets-Sheet 3
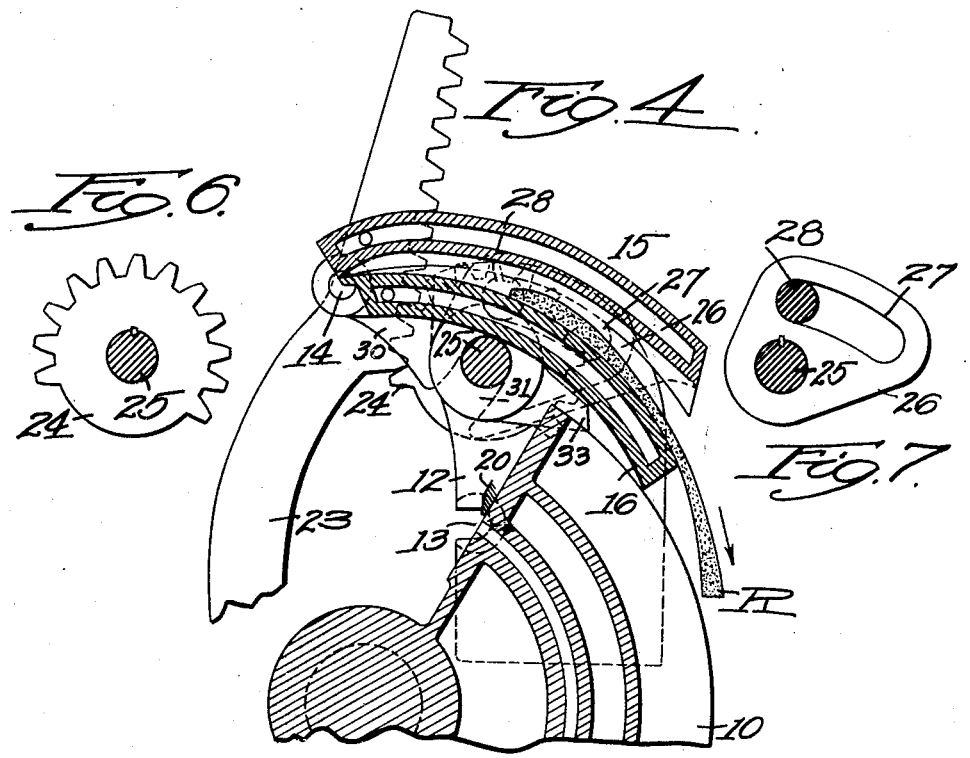
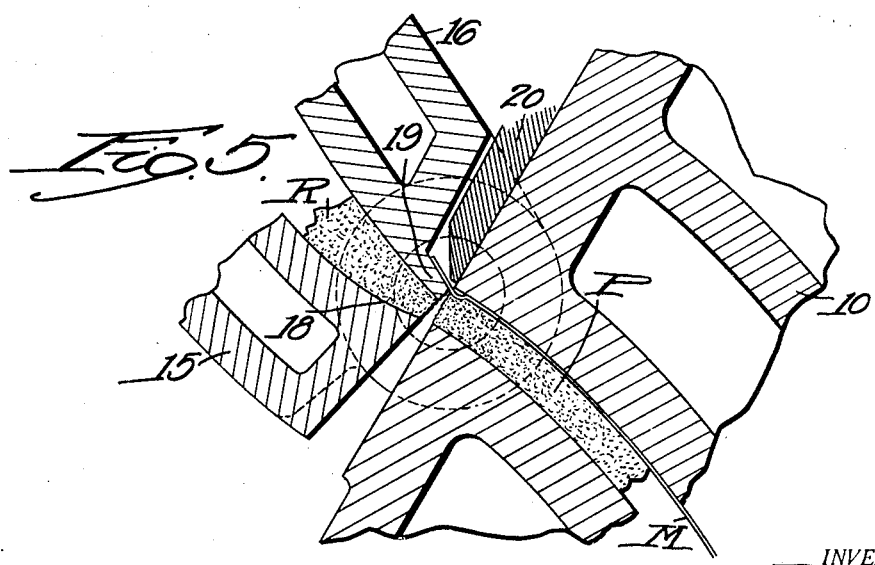
INVENTOR.
Hans C. Jordhoy.
BY
Southgate Foy & Hanley
ATTORNEYS Patented Oct. 11, 1932

1,881,648

UNITED STATES PATENT OFFICE

HANS C. JORDHOY, OF NORTH PLAINFIELD, NEW JERSEY, ASSIGNOR TO WOOD NEWSPAPER MACHINERY CORPORATION, OF NEW YORK, N. Y., A CORPORATION OF VIRGINIA

METHOD OF SEPARATING THE RISER FROM A STEREOTYPE PRINTING PLATE

Original application filed May 12, 1926, Serial No. 108,632. Divided and this application filed December 9, 1929. Serial No. 412,623. Renewed May 9, 1932.

This invention is a division of my application Serial No. 108,632, filed May 12, 1926 on apparatus for separating the riser from a stereotype plate.

The principal objects of the invention are to provide a method of separating the riser from the plate without necessitating the use of any trimming saws or any other cutting devices, thus eliminating a considerable proportion of the mechanism of a stereotype plate casting machine; to provide a method of separating the tail by a breaking action and in such a way that the exact line along which the break occurs will be determined and will be located at the edge of the printing area of the plate so that it will not leave an edge irregular enough to require finishing, and to provide a method of such a nature that the casting will have a thin zone along the line at which the riser is to be separated to insure the breaking of the riser off along a plane at that point.

Other objects and advantages of the invention will appear hereinafter.

Reference is to be had to the accompanying drawings in which

Fig. 1 is a front view of the end of a mold with the gate and operating mechanism for detaching the riser in accordance with this invention;

Fig. 2 is a sectional view of the mold and riser showing the operating parts with the mold in the position in which the plate is cast;

Fig. 3 is a similar view showing the parts in the position they assume after the riser is separated;

Fig. 4 is a view similar to Fig. 3 showing the position of the parts for delivering the riser;

Fig. 5 is an enlarged view of the parts in the position shown in Fig. 3 showing in detail how the riser is separated;

Fig. 6 is an end view of the operating gear, and

Fig. 7 is a similar view of a cam on the same shaft.

It has been customary heretofore, to remove the riser from a cast stereotype plate by sawing it off. This always involves considerable machinery. The saw not only has to be rotated on its own axis, but it has to be moved along the plate while rotating. Other methods are even more expensive.

According to this invention, this machinery is all eliminated and its difficulties avoided by simply breaking the riser from the plate. This can be done with several changes in the ordinary gates because, obviously, it would not be useful to break the riser off if it were broken with such a ragged surface as to require finishing afterwards. Therefore I have provided several of the steps above mentioned for securing the result of breaking off the riser at exactly the desired point and along a place not projecting beyond the plate. I do this in such a way as to leave an edge without any long projections extending from it and at the same time avoid the chance of injuring the matrix.

I locate the back 10 of the mold on a frame 11. The core 17 of the mold is constructed as usual and the parts are assembled in the usual way with the matrix M for receiving the metal in the position shown in Fig. 2.

The frame has a portion 12 on each side provided with a slot 13 which is of semi-circular shape at its rear wall and having horizontal top and bottom surfaces. These slots are formed as open sided bearings.

The axis of these bearings is located substantially in the plane of a tangent to the matrix M and very close to the edge of the mold. Preferably it is at the intersection of these two planes. In the two bearings or sockets 13 are located, at opposite sides of the machine, two pivoted studs 14. These studs project from the outer gate 15 in alignment with each other. The inner gate 16 is pivoted on the outer gate at the axis of these two studs. The gates overlap at their edges to hold the metal.

The gate sections are formed so that the metal will flow along a gently curved surface 18 on the outer gate directly into the mold. It does not encounter any sudden change in direction or any irregularities in the mold surface that would interfere with the gentle flow of the metal. The inner gate 16 is provided with a projection 19 which extends over the matrix M and when the mold is closed holds it back in position against a matrix bar 20. This projection 19 extends out part way across the width of the mold cavity just at the edge of the plate P. It is provided for the purpose of causing the section of the metal just at this point to be reduced in thickness. Furthermore the bottom edge of the projection 19 is radial and in alignment with the plane of the desired break across the edge of the cast plate. Therefore the casting is broken along this line as indicated in Fig. 5, and the edge is broken off in alignment with the flat surface on the bottom of the projection 18 which is sufficient to start the break in that direction. The width of the broken surface is comparatively small so that no great irregularities can occur. The manner of causing the break will be described after the details of the machinery are set forth.

On the frame 11 there is a hand operating lever 21 pivoted on a stud 22, said lever being provided with another arm which is pivoted to the bottom of a vertical rack 23. This lever, therefore constitutes a bell crank for raising and lowering the rack as will be seen by comparison of the drawings. This rack meshes with a segment gear 24, fixed on a shaft 25. Therefore this shaft will be oscillated by the swinging of the lever. On this shaft 25 is fixed a cam 26 having a cam slot 27 arranged of course, eccentrically to the shaft. In this cam slot operates a cam stud 28 which is fixed on the outer gate 15. This construction is duplicated on the other side of the machine as indicated in Fig. 1. As the cams 26 swing from the position shown in Fig. 2 to that shown in Fig. 3 the studs 28 are drawn in powerfully toward the shaft 25. As stated, the outer gate is pivoted by the studs 14 in the sockets 13. The axes of these sockets and studs are both substantially in the plane of the edge of the matrix M and in the plane of the end of the projection 19. The first motion of the operating handle in raising the rack 23 will cause the two gates 15 and 16 to swing from the closed position indicated in Fig. 2 to the open position indicated in Figs. 3 and 5 about said axis. This results in separating the riser R from the plate P by fracturing the casting along the connecting plane which is radial as indicated clearly in Fig. 5. It will be seen that the fracture is substantially in a plane which extends across the extreme end of the plate P where the projection 19 engages the bolster of the matrix.

Now the further movement of the lever 21 will move the gates positively upwardly with the cams 26 as the studs 28 are now at the bottom of the slots 27. This motion about the shaft 25 draws the pivoted studs 14 out of the sockets 13. As the two gates move upwardly, the inner gate is free to swing down against the shaft 25 thus separating these gates at what was their upper end. The riser R will be free to slide out from between them as indicated at Fig. 4. This is brought about by the fact that the gate 15 is provided at its end with the two flanges 30 each having an open ended slot 31. These slots are adapted to receive the shaft 25 when the parts are rocked over from the position shown in Fig. 3 to that shown in Fig. 4. In Fig. 2 the shaft 25 is within this slot so that the position of the gates is controlled vertically, but the rotation of the shaft 25 and the cam 26 from the position shown in Fig. 2 to the position shown in Fig. 3 brings the slots 31 inwardly so that the shaft 25 is located in the bottom thereof. Now, however, the further motion of the shaft 25 in the same direction necessarily results in swinging the gates upwardly, with the inner gate resting on the shaft by means of the flanges 30 and their slots.

In the position shown in Fig. 1 a projection 33 on the shaft 25 is brought into contact with the inner gate 16 to hold it in casting position, but upon the starting of the motion of the shaft 25, this projection swings upwardly as shown in Fig. 3 and finally downwardly as shown in Fig. 4, out of active position. The back, core, and gates are provided with water passages and connected so that cold water can be circulated in them to chill the cast very quickly.

The operation is very simple. Assume the parts to be in the position shown in Fig. 2 with the metal plate cast. After chilling the first thing accomplished is the breaking of the tail or riser from the cast plate. As the operating lever 21 is swung backwardly from the full line position in Fig. 2, the shaft 25 is turned so that the stud 28 is pulled toward the center by the cam 27 until the parts come to the position shown in Fig. 3. The result of this action is to swing the two gates on the pivoted studs 14 with a very strong leverage to the position shown in Fig. 3 and Fig. 5.

The metal in the riser is thus moved bodily a little sideways and broken apart from the metal in the plate. This turning on the shaft also swings the projections or rests 33 from contact with the inner gate as shown in Fig. 3.

The continued motion of the operating lever in the same direction has the effect of taking the studs 28 with the cams 26 because these studs are now at the bottoms of the cam slots. This necessarily carries the whole gate structure upwardly and around with the shaft 25 until it reaches the position shown in Fig. 4. Toward the end of the motion the gates are opened, that is separated from each other about their common pivot studs 14, leaving a space for the riser R which will drop out by gravity as indicated in Fig. 4.

By this time the core 17 has been turned around so as to deliver the cast plate by means not shown herein, but common in this art. The movement of the gates out of the way permits this action to take place without the plate engaging the gates. Now the core 17 being returned to casting position, the operating lever 21 can be turned back to swing the gates down through the position in Fig. 3 to that shown in Fig. 2. Then the parts are ready for the introduction of metal between the gates for the casting of a new plate. As the gates swing down into casting position, the projections 33 press against the back of the inner gate to hold the gates firmly in casting position so that the metal can not leak past the lower edge.

This method of operation eliminates the saws or other cutting devices that are used ordinarily for trimming off the riser and permits of removing it in the most expeditious manner, without leaving any materially rough edge in a position where it has to be trimmed off afterwards. The gates are in the proper place during the casting operation and they are held tightly against the casting box and core. The riser is disposed of with hardly any additional motion on the part of the operator and the plate is removed ready for shaving, if that is required.

This invention is not limited to the manufacture of semi-circular stereotype printing plates, but when applied thereto is especially suitable for application to the so-called horizontal casting boxes. Although I have illustrated and described only a single way of carrying out the invention, I am aware of the fact that modifications can be made therein by any person skilled in the art without departing from the scope of the invention as expressed in the claims. Therefore, I do not wish to be limited in these respects but what I do claim is:—

1. The method of preparing a stereotype printing plate which consists in casting it in a mold provided with a movable gate and breaking the riser off the plate at the edge of the plate by movement of the gate.

2. The method of preparing a stereotype printing plate which consists in casting it in a mold provided with a movable gate and, while the plate is held fast in the mold, breaking the riser off the plate along the edge of the mold by movement of the gate.

3. The method of preparing a curved stereotype printing plate in a mold provided with a movable gate which consists in casting the plate and breaking the riser from the plate along a substantially radial plane at the edge of the plate by movement of the gate.

4. The method of preparing a semi-circular stereotype printing plate which consists in casting the plate in a horizontal mold provided with a movable gate and breaking the riser from the plate along a substantial radial plane at the upper edge of the mold by movement of the gate.

5. The method of casting and preparing a stereotype printing plate for the press, which consists in casting the plate against the matrix and bodily moving the riser relatively to the plate at a point remote from the matrix to separate the riser from the plate without disturbing the matrix.

6. The method of casting and preparing a stereotype printing plate for the press which consists in casting the plate in the mold against the matrix, and, while the plate is in casting position, bodily moving the riser in a direction away from the matrix to separate the riser from the plate.

7. The method of casting a stereotype printing plate, which consists in pouring the metal into the mold through a movable gate and, when the metal sets, shifting the gate to break the riser from the plate along the edge of the latter.

8. The method of removing the riser from a stereotype printing plate, which consists in pouring the metal into the mold through a movable gate and, when the metal sets, swinging the gate about an axis at the meeting point of the edge of the plate and the matrix to break the riser from the plate.

9. The method of removing and delivering the riser of a stereotype printing plate, which consists in pouring the metal into the mold through a movable gate, when the metal sets, shifting the gate slightly to break the riser from the plate along the edge of the latter, and moving the gate bodily away from the mold.

10. The method of delivering the riser from a stereotype printing plate, which consists in pouring the metal, shifting the gate slightly to break the riser from the plate along the edge of the latter, and turning the gate up away from the mold to a position in which the riser can slide out of the gate by gravity.

In testimony whereof I have hereunto affixed my signature.

HANS C. JORDHOY.